US010511382B2

(12) United States Patent
Mansouri Rad et al.

(10) Patent No.: US 10,511,382 B2
(45) Date of Patent: Dec. 17, 2019

(54) DYNAMIC MONITORING AND CALIBRATION OF NODES IN AN OPTICAL NETWORKING DEVICE

(71) Applicants: Mohammad Mehdi Mansouri Rad, Kanata (CA); Hamid Mehrvar, Ottawa (CA); Zhiping Jiang, Kanata (CA); Eric Bernier, Kanata (CA)

(72) Inventors: Mohammad Mehdi Mansouri Rad, Kanata (CA); Hamid Mehrvar, Ottawa (CA); Zhiping Jiang, Kanata (CA); Eric Bernier, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/883,540

(22) Filed: Jan. 30, 2018

(65) Prior Publication Data
US 2019/0238224 A1 Aug. 1, 2019

(51) Int. Cl.
*H04B 10/079* (2013.01)
*H04B 10/071* (2013.01)
(Continued)

(52) U.S. Cl.
CPC ..... *H04B 10/07957* (2013.01); *H04B 10/071* (2013.01); *H04B 10/299* (2013.01); *H04B 10/801* (2013.01); *H04J 14/0212* (2013.01)

(58) Field of Classification Search
CPC ............ H04B 10/07957; H04B 10/071; H04B 10/299; H04B 10/801; H04J 14/0212
(Continued)

(56) References Cited

U.S. PATENT DOCUMENTS 5,031,985 A 7/1991 Shinoda et al.
8,077,298 B2 * 12/2011 Wang ................. G01M 11/3136
356/73.1
(Continued)

FOREIGN PATENT DOCUMENTS

CN 1391097 A 1/2003

OTHER PUBLICATIONS

Kilper et al., "Optocal Performance Monitoring", Journal of Lightwave Technology, vol. 22(1), Jan. 2004.
(Continued)

*Primary Examiner* — Dalzid E Singh

(57) ABSTRACT

A monitoring and calibration apparatus for an optical networking device such as ROADM is provided. Reflectors are integrated into the device, for example at the ends of optical interconnect cables. The reflectors reflect light in specific monitoring wavelengths and pass other wavelengths such as those used for communication. A light source emits monitoring light which is reflected by the reflector and measured by a detector to measure the integrity of optical paths. The optical paths can include optical cables and cable connectors. Path integrity between different modules of the device can therefore be monitored. Multiple reflectors, reflecting light in different wavelengths, can be placed in series along the same optical path and used to monitor multiple segments of the path. A wavelength selective switch (WSS) of the device can be used to route monitoring light to different optical paths. The WSS also operates to route communication signals in the device.

18 Claims, 13 Drawing Sheets

(51) Int. Cl.
*H04B 10/299* (2013.01)
*H04J 14/02* (2006.01)
*H04B 10/80* (2013.01)

(58) Field of Classification Search
USPC .......................................................... 398/34
See application file for complete search history.

(56) References Cited

U.S. PATENT DOCUMENTS

| | | | |
|---|---|---|---|
| 8,509,621 B2 | 8/2013 | Boertjes et al. | |
| 8,655,167 B1* | 2/2014 | Lam | H04B 10/071 |
| | | | 398/16 |
| 9,240,836 B1* | 1/2016 | Chen | G01M 11/3136 |
| 9,435,712 B2* | 9/2016 | Chen | H04B 10/07955 |
| 2003/0231888 A1* | 12/2003 | Takashina | H04B 10/071 |
| | | | 398/149 |
| 2011/0063605 A1* | 3/2011 | Clawson | G01M 11/3109 |
| | | | 356/73.1 |
| 2012/0134663 A1* | 5/2012 | Wang | H04B 10/032 |
| | | | 398/5 |
| 2016/0099851 A1 | 4/2016 | Archambault et al. | |
| 2016/0187224 A1* | 6/2016 | Chen | H04B 10/07955 |
| | | | 356/73.1 |
| 2016/0233956 A1* | 8/2016 | Kang | H04B 10/071 |
| 2016/0313182 A1 | 10/2016 | Kawada et al. | |
| 2017/0085317 A1* | 3/2017 | Ruchet | H04B 10/071 |
| 2017/0230108 A1* | 8/2017 | Wen | H04B 10/071 |
| 2017/0234767 A1* | 8/2017 | Leclerc | G01M 11/3136 |
| | | | 356/73.1 |
| 2017/0250752 A1* | 8/2017 | Yuki | H04B 10/07955 |
| 2017/0294959 A1* | 10/2017 | Archambault | H04B 10/071 |
| 2018/0266808 A1* | 9/2018 | Shaar | G01M 11/3109 |

OTHER PUBLICATIONS

"Performance Monitoring in Optical Networks", Centre for Advanced Research in Photonics: The University of Hong Kong, Taipei, Taiwan, WOCC 2004.

* cited by examiner

DYNAMIC MONITORING AND CALIBRATION OF NODES IN AN OPTICAL NETWORKING DEVICE

FIELD OF THE INVENTION

The present invention pertains to the field of optical devices and in particular to a method and apparatus for dynamic monitoring and calibration of nodes in an optical networking device, such as a Reconfigurable Optical Add Drop Multiplexer (ROADM).

BACKGROUND

Reconfigurable Optical Add Drop Multiplexers (ROADMs) have been developed as an integral part of optical communication networks employing wavelength division multiplexing (WDM). The ROADM allows for an all-optical form of communication traffic control by allowing certain wavelength channels to be added and dropped as needed. More recent advances in ROADM architectures include the Colorless, Directionless, Contentionless (CDC) ROADM and gridless and flexible grid ROADMs. Additionally, the number of degrees of a ROADM, i.e. the number of switching directions, has tended to increase over time.

However, advances in ROADM technologies tend to be accompanied by a corresponding increase in the number of optical interconnections within the ROADM. To manage this, designers tend to bundle interconnections by employing backplanes and multi-fiber cables, such as ribbon cables terminating in MTP/MPO (multi-fiber pus-on, multi-path push-on) connectors. Both of these factors lead to reliability concerns. With a larger number of interconnections, the probability of a fault and the difficulty of finding the fault both increase. Due to bundling, it becomes difficult or impossible to diagnose faults by replacing components, without the diagnostic procedure being service affecting. Such problems can also be found in other types of optical networking equipment.

Therefore there is a need for a method and apparatus for dynamic monitoring and calibration of nodes in an optical networking device that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for dynamic monitoring, calibration, or both monitoring and calibration of optical devices, such as nodes in an optical networking device. In accordance with embodiments of the present invention, a monitoring apparatus for an optical device, such as a ROADM or component thereof, is provided. The monitoring apparatus includes a light source configured to emit light in a first wavelength band. The emitted light is coupled onto a selected optical path associated with the optical device. The monitoring apparatus also includes a reflector located at a predetermined location on the optical path. The reflector is a wavelength-selective reflector configured to reflect light in the first wavelength band and pass light having wavelengths outside of the first wavelength band. The monitoring apparatus also includes a light detector placed and configured to receive and detect light from the optical path that is reflected by the reflector. The monitoring apparatus also includes a controller configured to operate the light source and receive signals from the light detector. In various embodiments, the optical device includes a first component and a second component connected by an optical interconnect (e.g. an optical fiber cable). The optical interconnect includes a portion of the optical path, the light source is co-located with the first component and the reflector is co-located with the second component. The light source, light detector, and controller can be integrated with or separate from the optical device being monitored.

In some embodiments the apparatus also includes at least a second reflector located at a second location on the optical path. The second reflector is configured to reflect light in a second wavelength band separate from the first wavelength band, and to pass light having wavelengths outside of the second wavelength band. The light source is further configured to emit second light in the second wavelength band, the second light coupled onto the optical path, and the light detector is further placed and configured to receive and detect light from the optical path that is reflected by the second reflector. As such, different segments of the same optical path can be monitored.

In some embodiments, the apparatus also includes a second reflector located at a predetermined location on a second, different optical path associated with the optical device. The second reflector is configured to reflect light in a second wavelength band equal to or different from the first wavelength band, and to pass light having wavelengths out of the second wavelength band. The light source is coupled onto the optical path and onto the second optical path via different respective endpoints, either concurrently or at different times. The light source is configured to emit light in the second wavelength band, the light in the second wavelength band coupled onto the second optical path. This light is emitted toward the second reflector and not necessarily toward the first reflector. The light detector is placed and configured to receive and detect light from the second optical path that is reflected by the second reflector.

In various embodiments, the optical device includes or is coupled to a wavelength selective switch (WSS), which is operated by the controller to selectably couple light from the light source onto one or more selected optical paths, such as the first and second optical paths, for example sequentially in time.

In accordance with other embodiments of the present invention, an optical device comprising a monitoring apparatus is provided. The monitoring apparatus is as described above and is integrated into the optical device. In some embodiments, the optical device is a ROADM, such as a CDC-ROADM, or another optical networking device. In some embodiments, the optical device comprises at least a Wavelength Selective Switch (WSS) and a backplane, the WSS and the backplane being connected by one or more optical interconnects such as fiber optic cables.

In accordance with other embodiments of the present invention, a method is provided for monitoring an optical device. The method includes emitting light in a first wavelength band from a light source. The method further includes causing the light to couple onto a selected optical path associated with the optical device. The method further includes monitoring, using a light detector, for light in the first wavelength band emitted by the light source and reflected along the optical path toward the light detector by a reflector. The reflector is located at a predetermined location on the optical path and configured to reflect light in the first wavelength band and pass light having wavelengths outside of the first wavelength band. In various embodiments, the optical device comprises a first component and a second component connected by an optical interconnect, the optical interconnect comprising a portion of the optical path. In such embodiments, the light source is co-located with the first component and the reflector is co-located with the second component.

In some embodiments, a second reflector is located at a second predetermined location on the optical path and is configured to reflect light in a second wavelength band separate from the first wavelength band, and to pass light having wavelengths outside of the second wavelength band. The light detector is further placed and configured to receive and detect light from the optical path that is reflected by the second reflector. In such embodiments, the method may further include: emitting second light in the second wavelength band from the light source; coupling the second light onto the optical path; and monitoring, using the light detector, for light in the second wavelength band emitted by the light source and reflected along the optical path toward the light detector by the second reflector.

In some embodiments, a second reflector is located at a predetermined location on a second optical path associated with the optical device, the second reflector configured to reflect light in a second wavelength band equal to or different from the first wavelength band, and to pass light having wavelengths outside of the second wavelength band. In such embodiments, the method may further include: emitting second light in the second wavelength band from the light source; coupling the second light onto the second optical path; and monitoring, using the light detector or a second light detector, for light in the second wavelength band emitted by the light source and reflected along the second optical path toward the light detector or the second light detector by the second reflector.

In some embodiments, causing the light to couple onto the selected optical path associated with the optical device comprises operating a wavelength selective switch (WSS) of the optical device to route the light onto the selected optical path, the WSS further operative to controllably route optical communication signals through the optical device according to a primary function of the optical device. The WSS may therefore be a component of both the optical device and the monitoring apparatus.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
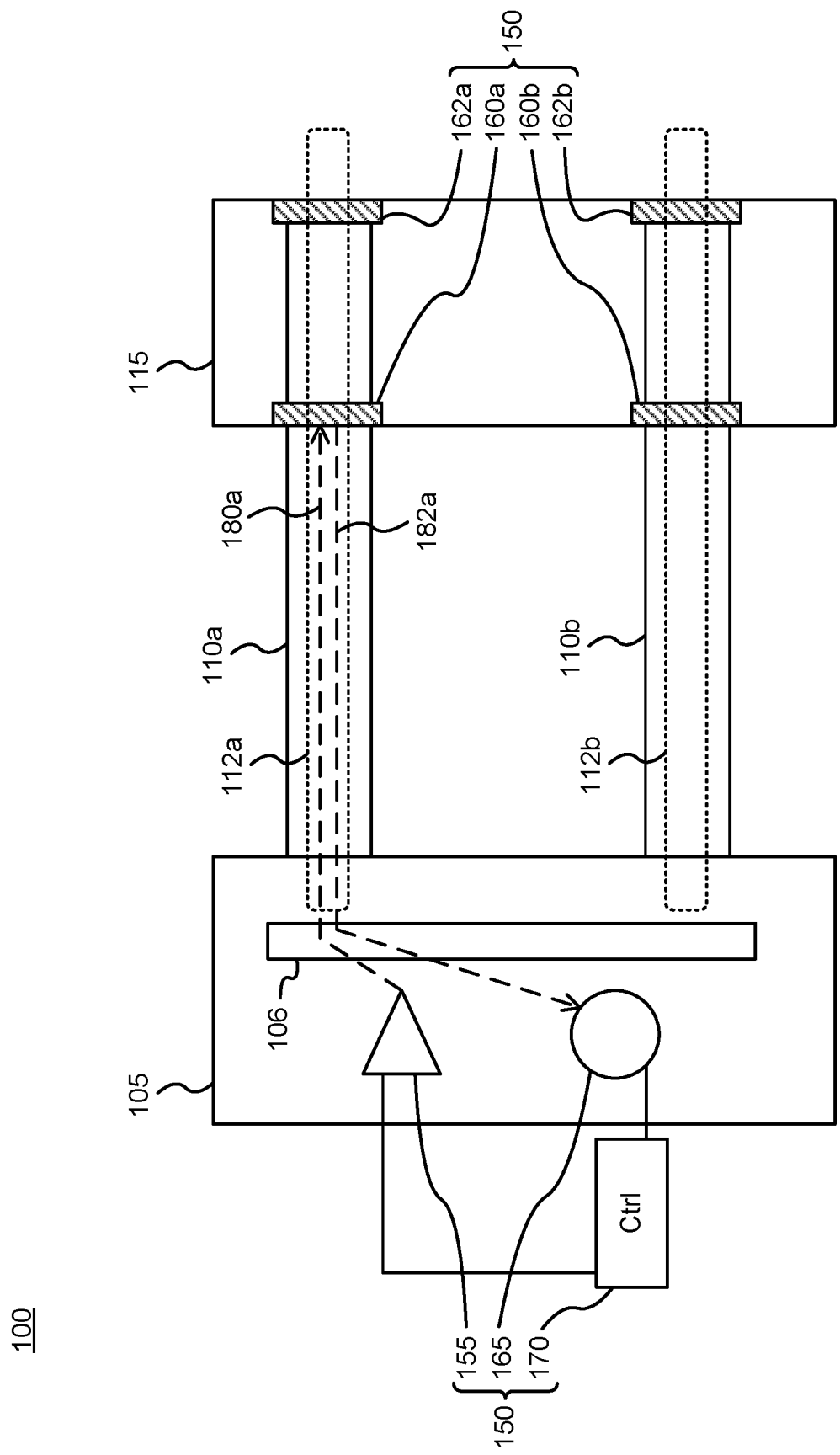
FIGS. 1A to 1D illustrate a host device and apparatus in accordance with an embodiment of the present invention.

Infrastructure performance monitoring and pinpointing is an important concern for ROADM architectures, such as CDC-ROADM devices, employing high density wavelength selective switches (WSS) and fiber optical cross-connect (OXC) modules. For such optical networking devices, it is desirable to monitor the performance of cabling infrastructure in a timely and reliable manner. Embodiments of the present invention provide for a cost effective method and apparatus for supporting dynamic monitoring and calibration of such optical networking devices. The solution employs a light source, a light detector, and passive reflective components integrated into or otherwise operatively coupled to the device. For a ROADM, the detectors may be located in the OXC module while the light source and detector may be located in the WSS modules. Such an approach may provide fast, reliable and non-intrusive calibration and troubleshooting capabilities.

Monitoring can refer to observing parameters such as power, loss, etc. The outcome of monitoring operations can be used for detecting equipment problems, for example by measuring optical properties (such as optical signal strength) and comparing them to an alarm threshold. Calibration can refer to updating the expected parameters, such as optical path losses, of deployed infra-structures. According to calibration, observed optical properties can be used to characterize expected behaviours of a device, and operation of the device can be adapted according to the expected behaviours. Calibration can involve performing corrective or adaptive actions based on output of monitoring operations.

Embodiments of the present invention can be used to detect and pinpoint potential problems in a proactive manner, therefore potentially reducing the mean time to repair for faults in an optical networking device, also referred to as a host device, such as a ROADM. The integration of the passive reflective components into the host device facilitates reliable distributed measurement of optical path integrity. Embodiments of the present invention comprise ongoing monitoring of optical path quality and integrity, which allows for proactive fault identification and diagnosis.

Embodiments of the present invention provide for the dynamic monitoring, calibration, or both monitoring and calibration of nodes in a host device. The host device typically includes multiple light paths with different ingress points, egress points, or both. One or more wavelength-selective reflectors (referred to herein simply as reflectors) are integrated into the host device. Each reflector is disposed at a predetermined location within a corresponding lightpath of the host device.

For example, a lightpath may include a first optical fiber that is coupled to a second optical fiber or other optical waveguide, where the first optical fiber is a stand-alone fiber or part of a cable, and the second optical fiber or waveguide is integrated into another structure such as a backplane or optical cross connect (OXC) component. A reflector may be placed at the point of interconnection between the first optical fiber and the second optical fiber or waveguide. This point of interconnection can include male and female connectors, such as MTP/MPO connectors in the case of multi-fiber cabling. Multiple such cables, each having multiple fibers, can be provided between modules, such as between a WSS and an OXC.

As will be readily understood by a worker skilled in the art, the OXC component comprises a plurality of optical fibers or waveguides for optically interconnecting pairs of connections at ports arranged around the periphery of the OXC. Although use of an OXC simplifies connectivity, an increased number of connectors are required because WSS modules are no longer directly connected by contiguous cables. This causes an increase in average loss and a potential increase in loss deviations. Therefore, calibration becomes more critical. Additionally, fiber connectivity is more susceptible to performance degradation, for example due to aging. Reliability is also more critical because individual fibers are bundled together by multi-fiber cabling and any signal is passing through the OXC.

Continuing with the above example, it is noted that interconnections may be by way of MTP/MPO or similar fiber cable connectors in the case of multi-fiber cabling. In such cases, where multiple light paths are in close proximity, rather than using a separate reflector per light path, a single reflector component that spans multiple light paths can be used in some embodiments. For example, an insert containing multiple reflectors aligned with the multiple light path interconnects of a fiber cable connector can be provided an interposed between the male and female halves of the fiber cable connector. Alternatively, the reflectors can be integrated into the male or female half of such a connector.

The reflectors are wavelength-selective in that they are configured to reflect incident light, in a particular wavelength band, back toward its source. In various embodiments, the majority of such light is reflected, with limited to no leakage through the reflector. The reflectors are further configured to pass light having wavelengths outside of this particular band, with little/partial to no attenuation. The reflectors can therefore alternatively be described as filters. The reflectors are typically passive reflectors. This allows the invention to be implemented without requiring control and power means for operating active, e.g. tunable reflectors. This also leads to improved reliability (relative to the use of active reflectors) due to reduced complexity. However, it is contemplated that active reflectors may also be used. In some embodiments, the reflectors are Fiber Bragg Grating (FBG) reflectors. In some embodiments, the reflectors are based on thin-film filtering technology. The reflectors are configured to be substantially (e.g. close to 100%) transparent to optical communication signals passing through the light paths which they are disposed in.

By way of example, an appropriate and readily available FBG reflector may have a reflectivity of 99.99% for wavelengths in the reflected band, and an insertion loss of less than 0.1 dB. The reflected band may have a bandwidth of about 1 nm to 10 nm, for example.

With the reflectors in place, a light source and detector can be used to monitor the quality or integrity of a light path as follows. Light falling within the reflector's reflection band is emitted from the light source onto the light path. The light source may be a laser or a light-emitting diode, for example. The light detector may be a photodetector such as a photodiode. The light detector is configured to measure an amount of light incident thereon, for example a power or intensity of light. In some embodiments, the light detector is configured to measure amounts of light separately for two or more different wavelength bands. In other embodiments, the light detector measures total amount of light within a single fixed or configurable wavelength band encompassing or overlapping with the wavelengths of the transmitted light. The transmitted light may be configured so that it is fully within the reflected band. The light encounters the reflector and is reflected back toward the detector. Where the reflector divides the light path into a first section and a second section, the light source and the detector are both coupled to the first section. The amount of light emitted by the light source and received by the detector due to reflection is indicative of the quality or integrity of the portion of the light path up to the reflector.

In various embodiments, when the detector detects at least a predetermined amount of light in the band that is emitted by the light source, the light path up to the reflector is determined to have adequate integrity or quality. When the detector detects less than the predetermined amount of light, an alarm or fault condition can be set for that light path and in particular the portion of the light path prior to the reflector.

In some embodiments, the light from the light source is constant, rather than pulsed or modulated. In other embodiments, the light from the light source is pulsed, modulated, or both. In one embodiment, the light can be pulsed and a time series analysis of the reflected pulses from different reflectors can be performed. Modulated or pulsed light can be used to differentiate between different emitted light signals, for example, to convey information relevant to the monitoring process, or to create a certain characteristic in the reflected light that is indicative of the light path quality, integrity, or other characteristic. In some embodiments, the light can be pulsed and a time series analysis of reflected pulses from different reflectors can be performed. The analysis can be based on a variety of schemes such as a code division multiple access scheme.

The above process can be repeated for different light paths, different sections of the same light path, or both. Two, three or more sections of the same light path can be monitored by placing multiple reflectors along the same light path at different locations. Each of the reflectors is configured to reflect light in a different band of wavelengths. Each pair of the different bands is at least partially non-overlapping. The light source can then emit light in each of the bands and the detector can detect reflected light in each of the bands. The amount of detected reflected light in a given band is indicative of integrity of the light path from the light source, to the reflector corresponding to that band, and back to the detector. Processing together of the detector outputs for different bands can be performed in order to isolate a fault.

In some embodiments, the light source may emit a sequence of beams each corresponding to a wavelength band of a different one of the reflectors. In this case, the detector can be configured to detect light in at least a union of all the wavelength bands for all the reflectors, with this configuration unchanged for the sequence of beams. This is considered to be a desirably simple implementation, because the detector tuning is relatively constant. Alternatively, the detector may be tuned to each wavelength band at the time that its reflection is expected. As yet another alternative, the light source may emit a beam concurrently corresponding to two or more wavelength bands of two or more of the reflectors. In this case, the detector may be required to detect light in each of the wavelength bands concurrently, and also to distinguish between light in each of the wavelength bands. The detector may comprise sub-detectors each configured to detect light in a different band, for example.

It is noted that the same light source and detector can be used to monitor multiple light paths, for example parallel light paths. This involves coupling the light from the light source onto a plurality of the light paths, and coupling the reflected light onto a path toward the detector. For example, the source light can be coupled onto different light paths sequentially over time by means of a switch, such as a WSS. Notably, when the host device includes such a switch (e.g. a WSS of a ROADM), this same switch can be used both for switching communication signals according to the primary function of the host device, and for switching light from the light source onto selected light paths for monitoring and calibration purposes. As such, the present invention can be implemented efficiently using a limited number of components. Wavelength-selective reflectors on different light paths can have similar properties. For example, the first wavelength-selective reflector on each light path can reflect light in the same first band, the second wavelength-selective reflector on each light path can reflect light in a second band, etc. Light paths can then be monitored one at a time. For a ROADM, all light paths are monitored in some embodiments.

In some embodiments, rather than different reflectors on the same light path being configured to reflect light in different wavelength bands (as described above), two or more reflectors on the same light path can be configured to reflect light in the same wavelength band. In this case, each of the two or more reflectors (except possibly the last reflector on the light path) are configured to reflect only a portion of light in the wavelength band, and to pass the remainder of light in the wavelength band toward the next reflector. In some embodiments, the reflectivity of some or all of the two or more reflectors is different. For example, in the case of two reflectors on the same light path, the first reflector (closest to the light source) may reflect 50% of light in the wavelength band, and the second reflector may reflect 100% of light in the wavelength band. The amount of detected reflected light is indicative of the light path quality or integrity. In some embodiments, one, two, or more reflectors on the light path may reflect light in a first wavelength band, and one, two, or more other reflectors on the same light path may reflect light in a second, different wavelength band. By using multiple reflectors tuned to the same wavelength band, operation of the light source and light detector can be simplified, and the bandwidth dedicated to monitoring can be reduced. Isolation of a fault can potentially become more complex. However, by selecting the reflectivities of the reflectors, different fault conditions or sets of fault conditions can be associated with detection of different amounts of reflected light.

FIGS. 1A to 1D illustrate a host device 100 coupled to an apparatus 150, according to an embodiment of the present invention. The apparatus 150 includes multiple parts and is therefore designated by multiple arrows. The host device 100 includes a first optical 105 component and a second optical component 115 connected by optical interconnects 110a and 110b. The first component 105 may comprise, for example, a switch such as a WSS, and the second component 115 may comprise, for example, a front plane, backplane, or optical cross connect (OXC). The optical interconnect 110a may comprise, for example, an optical fiber or cable comprising multiple optical fibers. Losses across each optical interconnect and across the OXC can be on the order of about 1 dBm or less, for example losses can be between 0 dB and 2 dB.

The apparatus 150 includes a light source 155 configured to emit light in a first wavelength band, the light coupled onto an optical path 112a in the host device (e.g. ROADM) 100. The optical interconnect 110a comprises a portion of the optical path 112a. The light source 155 is co-located with the first component 105. For example the light source 155 may be integrated into or directly coupled to the first component 105. This includes that the light source 155 is on the same side of the optical interconnect 110a as the first component 105. That is, the optical interconnect routes light between a first end and a second end, and the first component and the light source are both coupled to the optical interconnect via the first end.

In some embodiments, the light source 155 is separate from the first component 105. For example, the light source 155 can be integrated into a remote device and the light can be provided via a connector such as a fiber-optic cable. The light source can be integrated into a separate electronic module, such as a circuit card, that is co-located with the first component or co-located with another module of the host device. The light source can be located upstream of the first component, and may be separate from the host device. For example, the light source may provide light to one or multiple host devices via optical cables. The light detector 165 can similarly be separate from the first component 105.

The apparatus 150 also includes a reflector 160a at a predetermined location on and within the optical path 112a. The reflector 160a is configured to reflect light in the first wavelength band and pass light having wavelengths outside of the first wavelength band, including optical communication signals being handled by the host device 100. As illustrated, the reflector 160a is co-located with the second component 115. This includes that the reflector 160a is on the same side of the optical interconnect 110a as the second component 115.

The apparatus 150 also includes a light detector 165 placed and configured to receive and detect light from the optical path 112a that is reflected by the reflector 160a. The light detector 165 may also be co-located with the first component 105. The light source 155 and light detector 165 may be located close together. In some embodiments, a calibration light path may be provided directly between the light source 155 and light detector 165, so that the light detector can be checked and calibrated by emitting light from the source to the detector via the calibration path, which is received substantially without attenuation. For example, the light detector 165 and the light source 155 can be coupled together using an optical circulator or an optically controlled switch.

FIG. 1A illustrates operation of the apparatus involving the reflector 160a. The light source 155 emits light 180a in the first wavelength band, the light is coupled onto the optical path 112a, and the light detector 165 is placed and configured to receive and detect light 182a from the optical path 112a that is reflected by the reflector 160a. The round-trip path of emitted and detected light is shown as 180a, 182a.

The apparatus 150 also includes a controller 170 configured to operate the light source 155 and receive signals from the light detector 165. The controller 170 may comprise a microprocessor operatively coupled to a memory and configured to execute program instructions stored in the memory. The controller may comprise a microcontroller, an application specific integrated circuit (ASIC), field programmable gate array (FPGA), or other digital or analog electronic circuitry, or a combination thereof. The controller 170 can be a dedicated component of the apparatus 150. Alternatively, the controller 170 can be a controller of the host device 100 that is also configured to operate as a controller of the apparatus 150. This can reduce the number of additional components required for the apparatus 150.

Although in some embodiments only the above-mentioned components are provided in the apparatus 150, additional components, provided according to other embodiments, are also illustrated and described below. In some such embodiments, the apparatus further includes a second reflector 162a located at a second predetermined location on the optical path 112a. As illustrated, the second reflector 162a is also co-located with the second component 115. The second reflector 162a is configured to reflect light in a second wavelength band separate from the first wavelength band, and to pass light having wavelengths out of the second wavelength band.

As illustrated, the reflector 160a is located at a first (e.g. ingress) connector port of the second component 115, and the second reflector 162a is located at a second (e.g. egress) connector port of the second component 115. However, the reflectors may alternatively be placed at other locations. In the illustrated configuration, the portion of the optical path 112a from the first component 105 to the ingress connector can be monitored separately from the portion of the optical path 112a from the first component 105 to the egress connector.

Figure 1B:
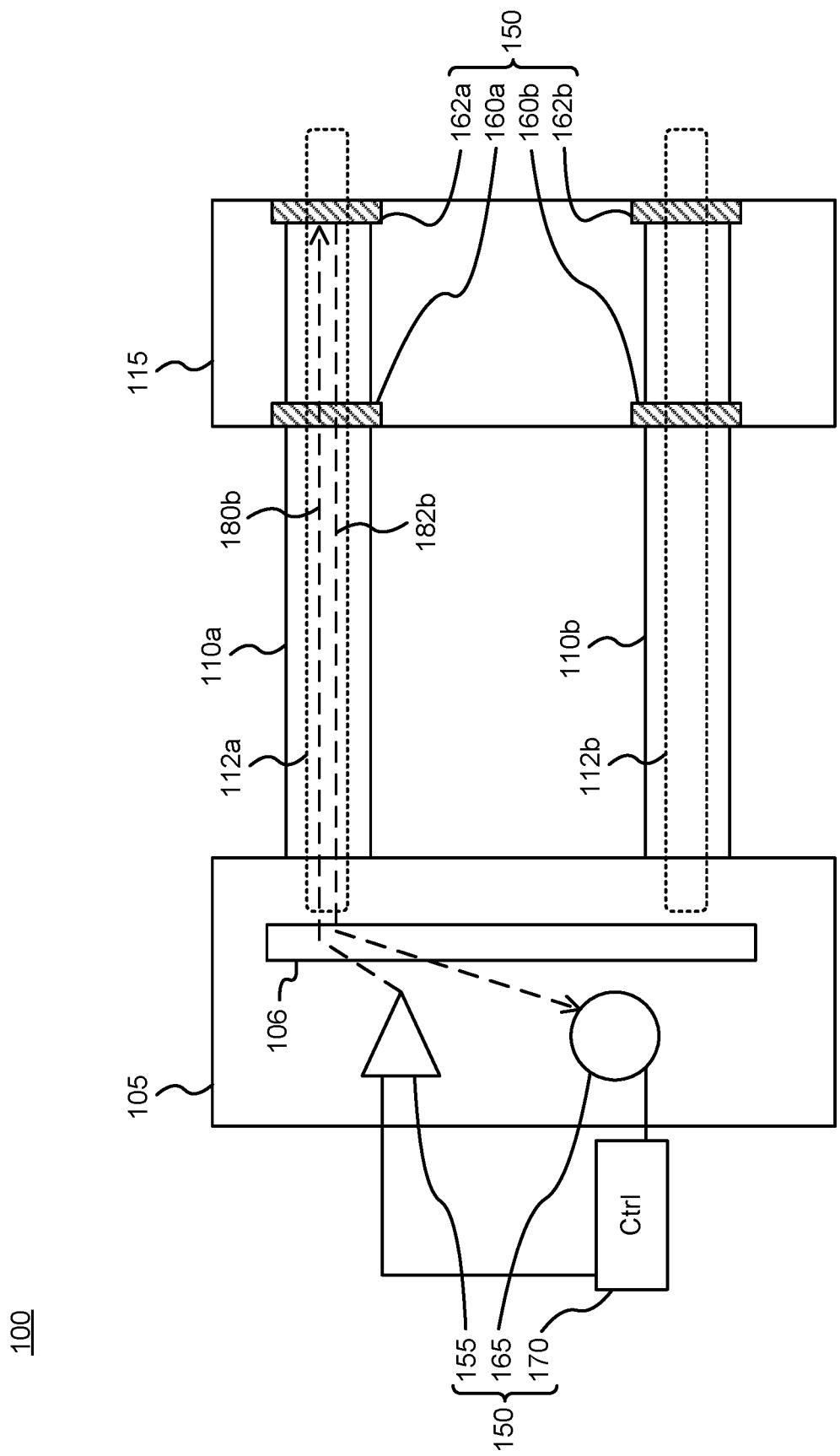

In such embodiments, as illustrated in FIG. 1B, the light source 155 is further configured to emit second light 180b in the second wavelength band. The second light is coupled onto the optical path 112a. The light detector 165 is placed and configured to receive and detect light 182b from the optical path 112a that is reflected by the second reflector 162a. The round-trip path of emitted and detected light is shown as 180b, 182b. Because the second light is in a different wavelength band, it is not blocked by the first reflector 160a.

Although only two reflectors per light path are shown in FIGS. 1A to 1D, additional reflectors reflecting different wavelength bands can also be included. The number of reflectors along a light path is limited by factors such as the acceptable cumulative insertion loss and the available bandwidth for calibration relative to the bandwidth of each reflector (so that each reflector reflects light in a different band that is not reflected by any other reflector). In some embodiments, two, three, four, or potentially up to about 25 reflectors may potentially be included. The number of different portions of the light path that can be separately monitored is equal or approximately equal to the number of reflectors.

FIGS. 1A to 1D further illustrate a second optical path 112b in the host device 100. It should be noted that there are also typically further optical paths, although these are not shown for clarity. Part of the second optical path 112b is provided via a second optical interconnect 110b of the host device. The second optical interconnect 110b may be part of the same multi-fiber cable as the optical interconnect 110a (and thus share a common connector), or it may be a separate interconnect or part of a separate cable. As illustrated, for clarity, the second optical interconnect 110b connects the first component 105 and the second component 115. However, in other embodiments, the second optical interconnect 110b may connect the first component 105 with a third component (not shown) that is separate from the second component.

The apparatus further includes a third reflector 160b located at a predetermined location on a second optical path 112b. The second optical path 112b has an endpoint that is separate from an endpoint of the optical path 112a. For further clarity, the optical path 112a and the second optical path 112b are not necessarily sequential parts of the same overall path, but rather comprise separate branches or paths, such as parallel paths. The optical path 112a has first and second endpoints and the second optical path 112b has another first and second endpoints. The first endpoint of the optical path may be physically proximate to the first endpoint of the second optical path, however these first endpoints are not necessarily coupled together to form a single optical path. Rather, these two first endpoints may be separate endpoints of two separate optical paths. The third reflector 160b is configured to reflect light in a third wavelength band, which may be equal to or different from the first wavelength band, and to pass light having wavelengths out of the third wavelength band, e.g. at least in the fourth wavelength band described below.

The apparatus further includes a fourth reflector 162b located at a second predetermined location on a second optical path 112b. The fourth reflector 162b is configured to reflect light in in fourth wavelength band separate from the third wavelength band, and to pass light having wavelengths out of the fourth wavelength band. As illustrated, the fourth reflector 162b is also co-located with the second component 115.

As illustrated, the third reflector 160b is located at a connector port of the second component 115, and the fourth reflector 162b is located at another connector port of the second component 115. These connector ports may be the first and second connector ports of the first and second connectors (co-located with reflectors 160a, 162a), or different connector ports. However, the third and fourth reflectors may alternatively be placed at other locations. In the illustrated configuration, the portion of the second optical path 112b from the first component 105 to the ingress connector can be monitored separately from the portion of the second optical path 112b from the first component 105 to the egress connector.

Figure 1C:
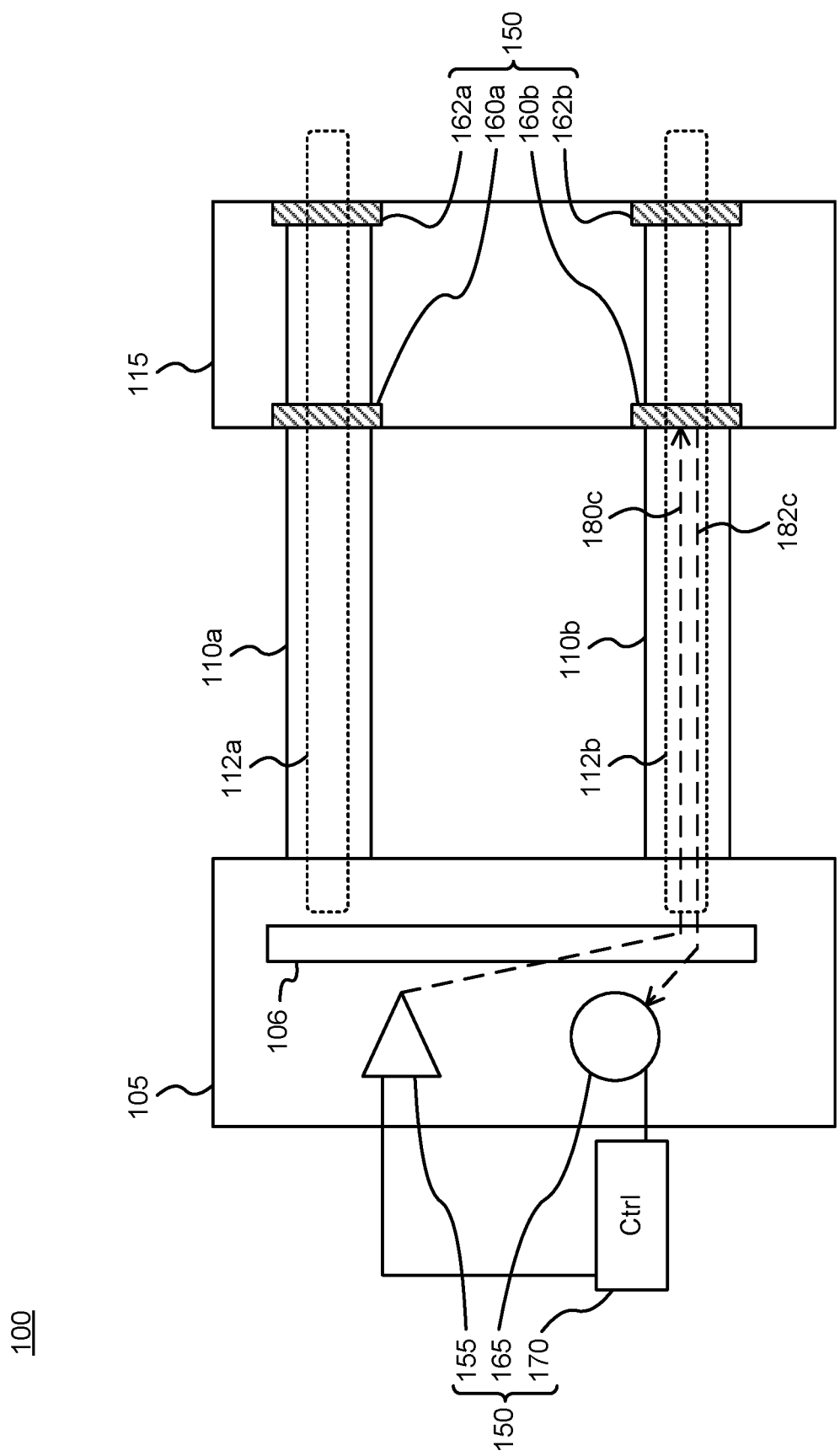

FIG. 1C illustrates operation of the apparatus involving the third reflector 160b. The light source 155 emits third light 180c in the third wavelength band, the light is coupled onto the second optical path 112b, and the light detector 165 is placed and configured to receive and detect third light 182c from the second optical path 112b that is reflected by the third reflector 160b. The round-trip path of emitted and detected third light is shown as 180c, 182c.

Figure 1D:
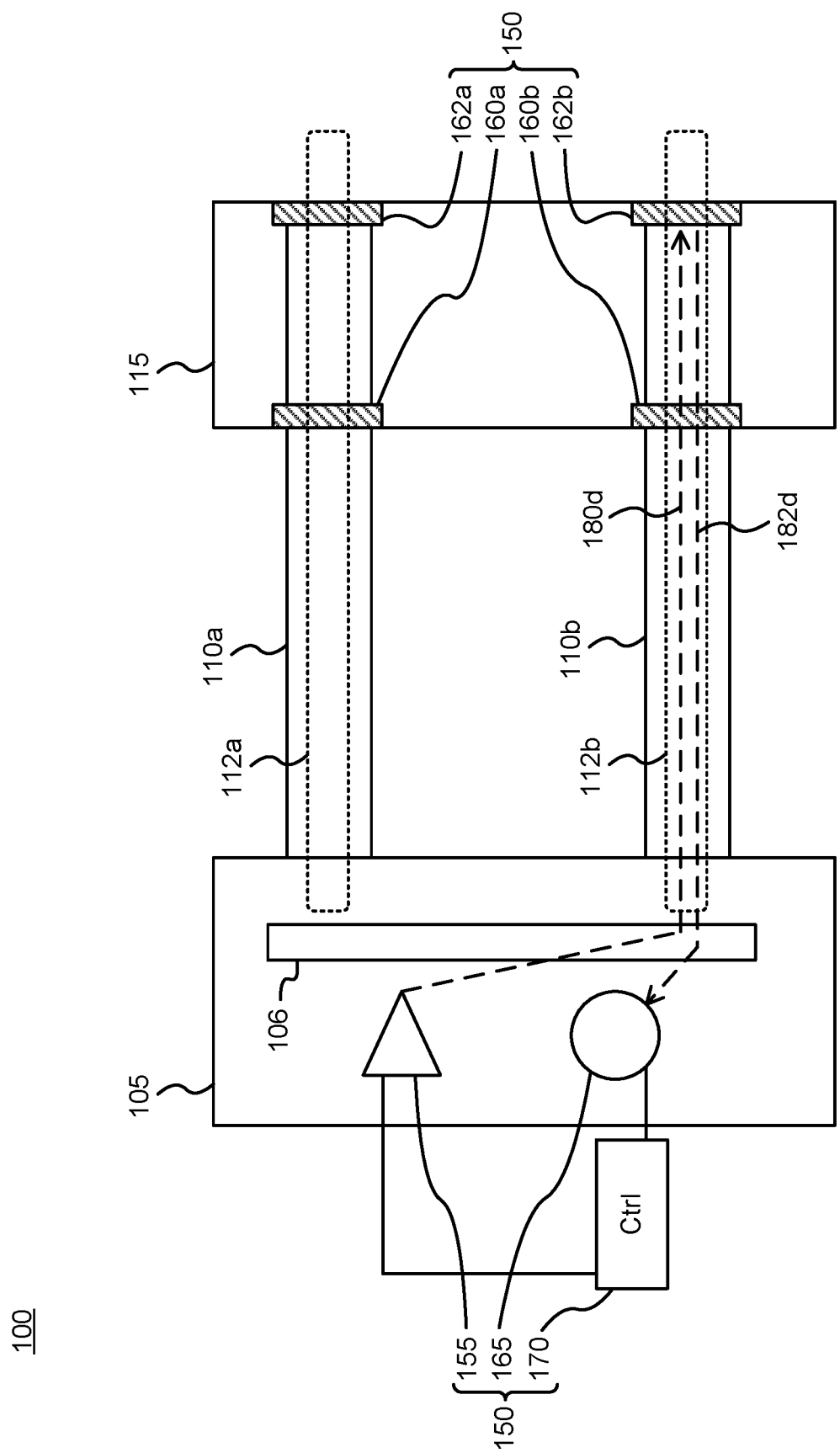

FIG. 1D illustrates operation of the apparatus involving the fourth reflector 162b. The light source 155 emits fourth light 180d in the fourth wavelength band, the fourth light is coupled onto the second optical path 112b, and the light detector 165 is placed and configured to receive and detect fourth light 182d from the optical path 112a that is reflected by the fourth reflector 162b. The round-trip path of emitted and detected fourth light is shown as 180d, 182d.

During operation, the light source 155 is coupled onto the optical path 112a via the endpoint of the optical path and onto the second optical path 112b via the endpoint of the second optical path concurrently or at a different time. Coupling light from the light source onto a desired optical path can be performed by means of an optical switch 106, such as a WSS. In various embodiments, the first component 105 is or comprises such a switch, and the light source can be coupled to an optical input of this switch. The controller 170 can also be operatively coupled to a control input of the switch and operative to cause the switch to route light from the light source to one or more desired optical paths at one or more times. In some embodiments, the controller can cause the switch to route selected wavelengths from the light source to selected optical paths, for example in the case of a WSS. This configuration facilitates controllable coupling from the light source onto the desired optical path without requiring an additional switching component.

Although only two components 105 and 115 are shown, there may be additional components. In other embodiments, there may be components between the first and second components 105 and 115, through which the optical paths 112a and 112b pass.

Monitoring of optical paths can be done repeatedly, for example periodically, according to a schedule, in response to an event, or a combination thereof. Each optical path is monitored by emitting light from the light source, routing the light onto the optical path, and monitoring for reflected light from a given reflector. By emitting different wavelengths of light, different portions of the same optical path can be monitored. For a given wavelength, the monitored portion begins at the light source and ends at the reflector that reflects that wavelength.

The amount of reflected light detected by the light detector, relative to the amount of light emitted by the light source, indicates the integrity of the monitored optical path. By performing repeated measurements, the evolution of path integrity can be monitored over time. For example, if successive measurements indicate a gradual decline in the amount of reflected light, a degradation in the optical path can be indicated. As another example, if successive measurements indicate a sharp decline in the amount of reflected light, a faulty or loose connection or otherwise broken or interrupted optical path can be indicated. The controller can be configured to perform successive measurements and indicate status or alarm conditions based on predetermined monitoring routines.

By combining measurements for different portions of the same optical path, the location of degradations, breaks or faulty connections along the optical path can be isolated. For example, an optical path may have N narrowband reflectors configured to reflect light in N different wavelength bands. The light source and light detector are co-located near an endpoint of the optical path and N optical path portions and N optical path segments are defined as follows. The first portion is the portion of the optical path between the light source and the closest reflector, the second portion is the portion of the optical path between the light source and the second closest reflector, and more generally the $m^{th}$ portion is the portion of the optical path between the light source and the $m^{th}$ closest reflector. Therefore, successive portions overlap. The first segment is equal to the first portion, the second segment is equal to the part of the optical path that belongs to the second portion but not the first portion, and more generally the $m^{th}$ segment is equal to the part of the optical path that belongs to the $m^{th}$ portion but not the $m-1^{st}$ portion. Therefore, successive segments are separate. Integrity of the N portions can be measured by tuning the light source to the N different wavelength bands, for example sequentially. If integrity of the first m<N portions is sufficiently high and integrity of the $m+1^{st}$ portion is significantly lower than its desired or last value, then a degradation, break or fault is determined as lying in the $m+1^{st}$ segment. The controller can be configured to implement this logic and output an indication that the $m+1^{st}$ segment should be checked and possibly repaired.

It is noted that in a given round of measurements, measurements for one or more of the portions may be omitted, at least initially. In one embodiment, the integrity of the Nth portion can be measured first. If this integrity of this portion is sufficiently high, measuring integrity of the other portions can be omitted in the current round of measurements.

The above illustrated embodiments show a single light source and light detector for monitoring multiple portions of a path. This configuration provides a simple and effective monitoring solution with a limited number of parts. However, it should be understood that multiple light sources at different locations, multiple detectors at different locations, or both, can be used for monitoring multiple portions of the path. For example, a first light source and light detector can be provided at a first end of the path and a second light source and light detector can be provided at a second end of the path. As another example, a light source and light detector can be coupled to the path at a location between the two ends of the path, for example at the midpoint. This may be as an alternative or in addition to light sources and detectors at one or both ends of the path.

The above illustrated embodiments show the light source and light detector being co-located. This configuration also simplifies the monitoring solution and allows for a short calibration light path between source and detector, if desired. However, in other embodiments, the light source and light detector may be provided at different locations. Furthermore, in some embodiments, multiple light detectors are provided at different locations for monitoring light from the same light source. The different light detectors can be coupled to the light path at different locations.

Figure 2A:
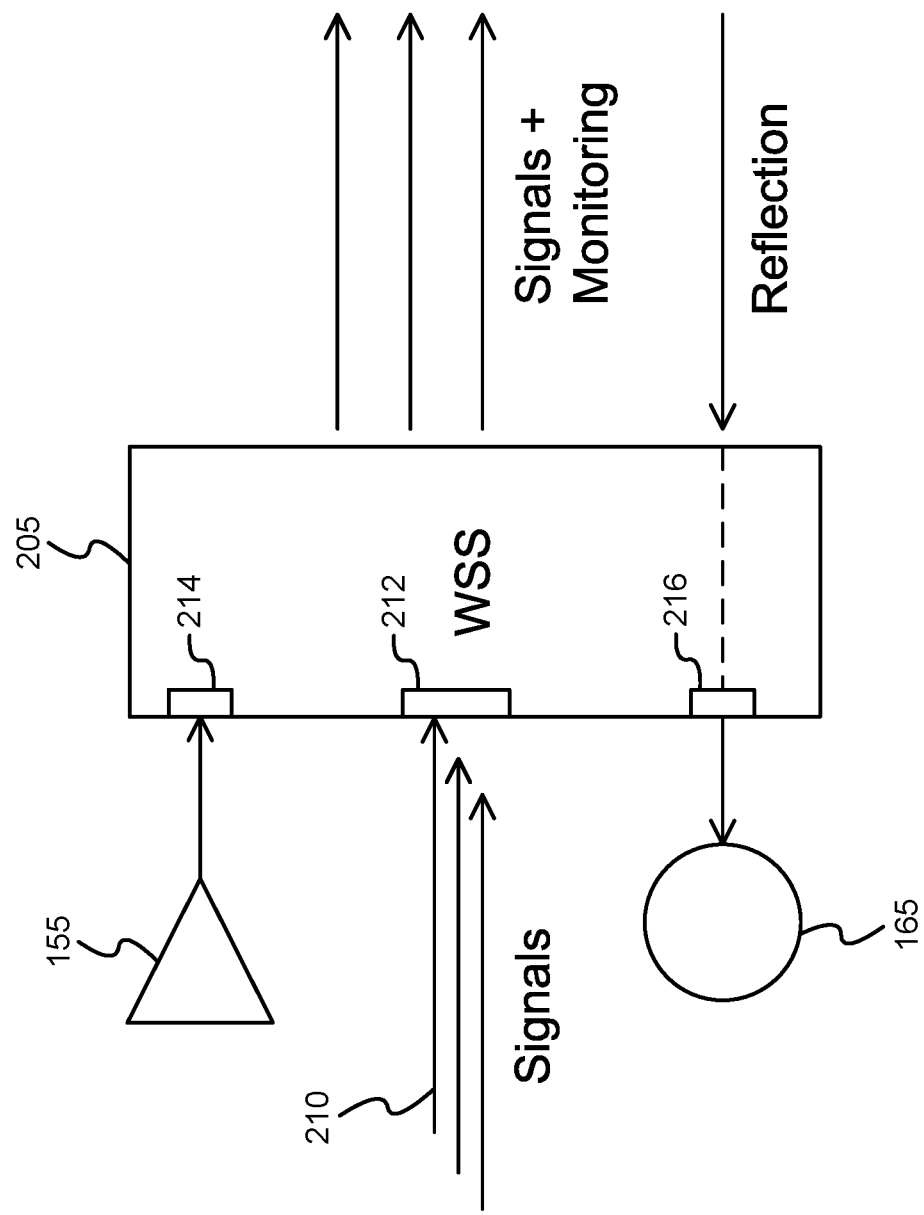
FIG. 2A illustrates a WSS operatively coupled to a light source and a light detector in accordance with an embodiment of the present invention.

FIG. 2A illustrates a WSS 205 operatively coupled to a light source 155 and a light detector 165 in accordance with an embodiment of the present invention. The WSS 205 operates as a component of both the host device and the monitoring apparatus. The WSS 205 receives optical signals 210 at one or more input ports and routes them to appropriate output ports according to a desired operation of the host device. For example, in the case of a ROADM, the optical signals 210 can be wavelength division multiplexed signals received at a single input port 212, which are then routed to express or add/drop ports based on control signals. The WSS 205 further receives light from the light source 155 via another input port 214. Inputs from the two input ports 212 and 214 merged together internally by the WSS prior to light from these inputs being provided to switching components. Thus, the WSS 205 can be operated to route light from the light source 155 to a controllable one of its output ports.

The WSS 205 further includes a detection port 216 configured to receive and pass light emitted by the light source 155 and reflected by a reflector of the apparatus. The detection port is coupled to the light detector 165. The WSS may be a bi-directional switch, and the detection port 216 may be coupled to the input port 212 for receiving light received at the switch and propagating in the reverse direction to the signals 210. That is, the WSS can be configured to receive the reflected light and direct the reflected light toward the detection port 216, which may be coupled to or separate from the input port 212, depending on construction of the WSS.

In some embodiments, the ports 214 and 216 are external ports of the WSS 205 and the light source 155 and light detector 165 are external components coupled to the WSS 205 via these ports. In other embodiments, the ports 214 and 216 are internal ports of the WSS 205 and the light source 155 and light detector 165 are integrated into the WSS 205 as internal components.

Figure 2B:
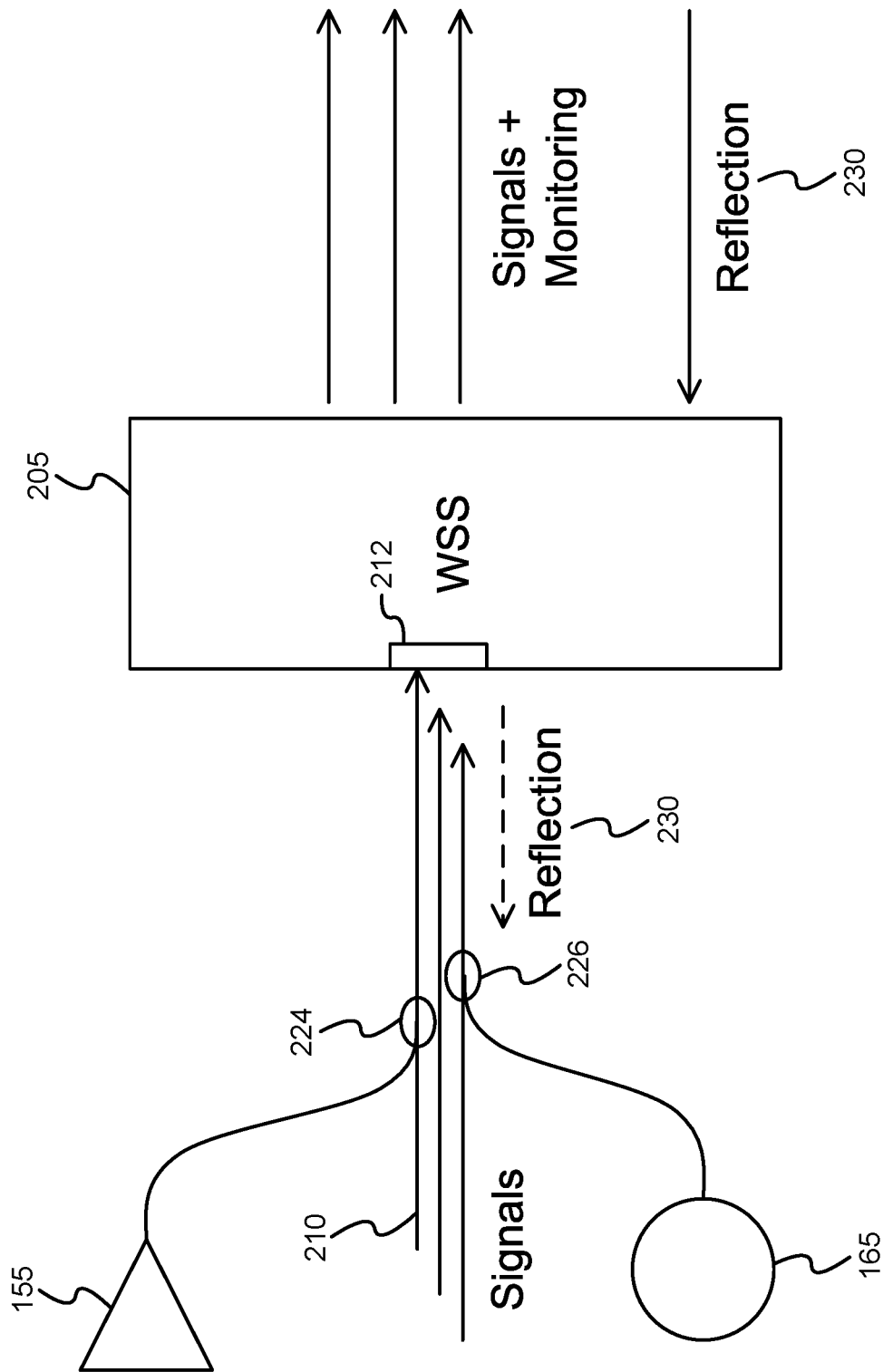
FIG. 2B illustrates a WSS operatively coupled to a light source and a light detector in accordance with another embodiment of the present invention.

FIG. 2B illustrates a WSS 205 operatively coupled to a light source 155 and a light detector 165 in accordance with another embodiment of the present invention. The WSS 205 is similar to that described above with respect to FIG. 2A, however the additional ports 214 and 216 are omitted. Instead, the light from the light source 155 is merged with the optical signals 210 via an optical coupler 224 such as a directional coupler.

The WSS 205 is also configured to receive and pass light emitted by the light source 155 and reflected by a reflector of the apparatus. This reflected light 230 is output through the port 212 and provided to the light detector 165 using an optical coupler 226 such as a directional coupler.

In some embodiments, the couplers 224, 226, the light source 155 and the light detector 165 are external components coupled to the WSS 205, e.g. via port 212. In other embodiments, the couplers 224, 226, the light source 155 and the light detector 165 are integrated into the WSS 205 as internal components.

Figure 3:
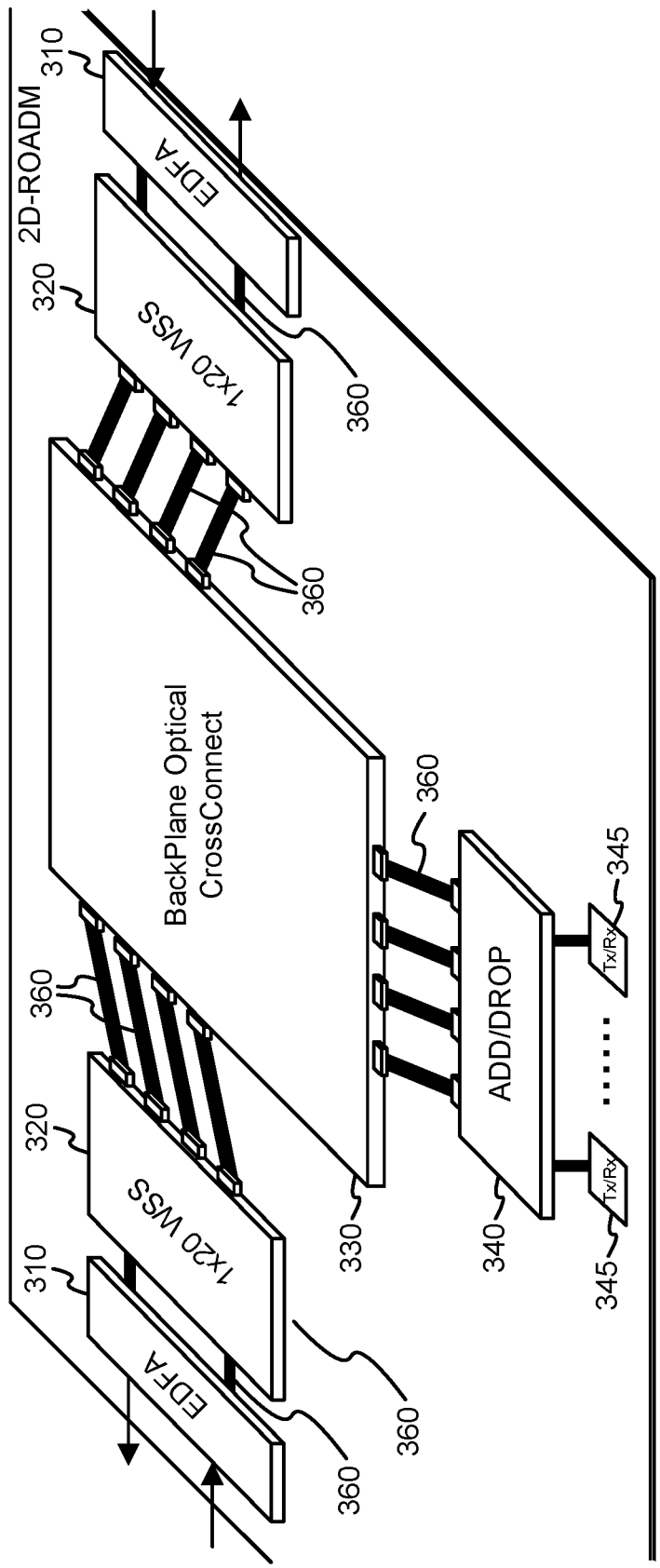
FIG. 3 illustrates a prior art two degree ROADM which may operate as a host optical networking device embodiments of the present invention.

FIG. 3 illustrates a prior art two degree ROADM 300 which may operate as a host optical networking device embodiments of the present invention. Higher-degree ROADMs can similarly operate as host devices. The ROADM 300 includes a pair of Erbium doped fiber amplifier (EDFA) modules 310, a pair of 1×20 WSS modules 320, a backplane optical cross connect module 330, an add/drop module 340, and optical transmitter/receivers 345 coupled to the add/drop module 340. The EDFAs may be replaced with other suitable types of optical amplifiers. The modules are coupled together using optical interconnects 360 (only selected interconnects are labelled for clarity), such as multi-fiber cables with MTP/MPO connectors. The EDFA modules 310 and WSS modules 320 transmit and receive signals in both directions, and typically include a first set of sub-components and connection ports for receiving, handling and transmitting incoming signals, and a second set of sub-components and connection ports for receiving, handling and transmitting outgoing signals.

The EDFA modules 310 receive and amplify incoming optical communication signals, which are provided to corresponding WSS modules following amplification. The EDFA modules 310 also amplify outgoing optical communication signals received from corresponding WSS modules.

According to embodiments of the present invention, a light source and light detector are coupled to or integrated within one of the WSS modules 320, and at least one reflector is integrated into the backplane optical cross connect module 330, for example at a port connector thereof. According to some embodiments, one, some or all of the WSS modules 320, the backplane optical cross connect module 330 and the add/drop module 340 are provided with one or more light sources, light reflectors, light detectors and controllers of the monitoring apparatus. At least two of these monitoring apparatus components are integrated into or coupled to different modules of the ROADM 300. For example, a reflector may be integrated into a different module than a light source and light detector. At least one WSS of a WSS module 320 may be configured to receive and controllably route light from the apparatus light source to a selectable optical path comprising a reflector.

Figure 4A:
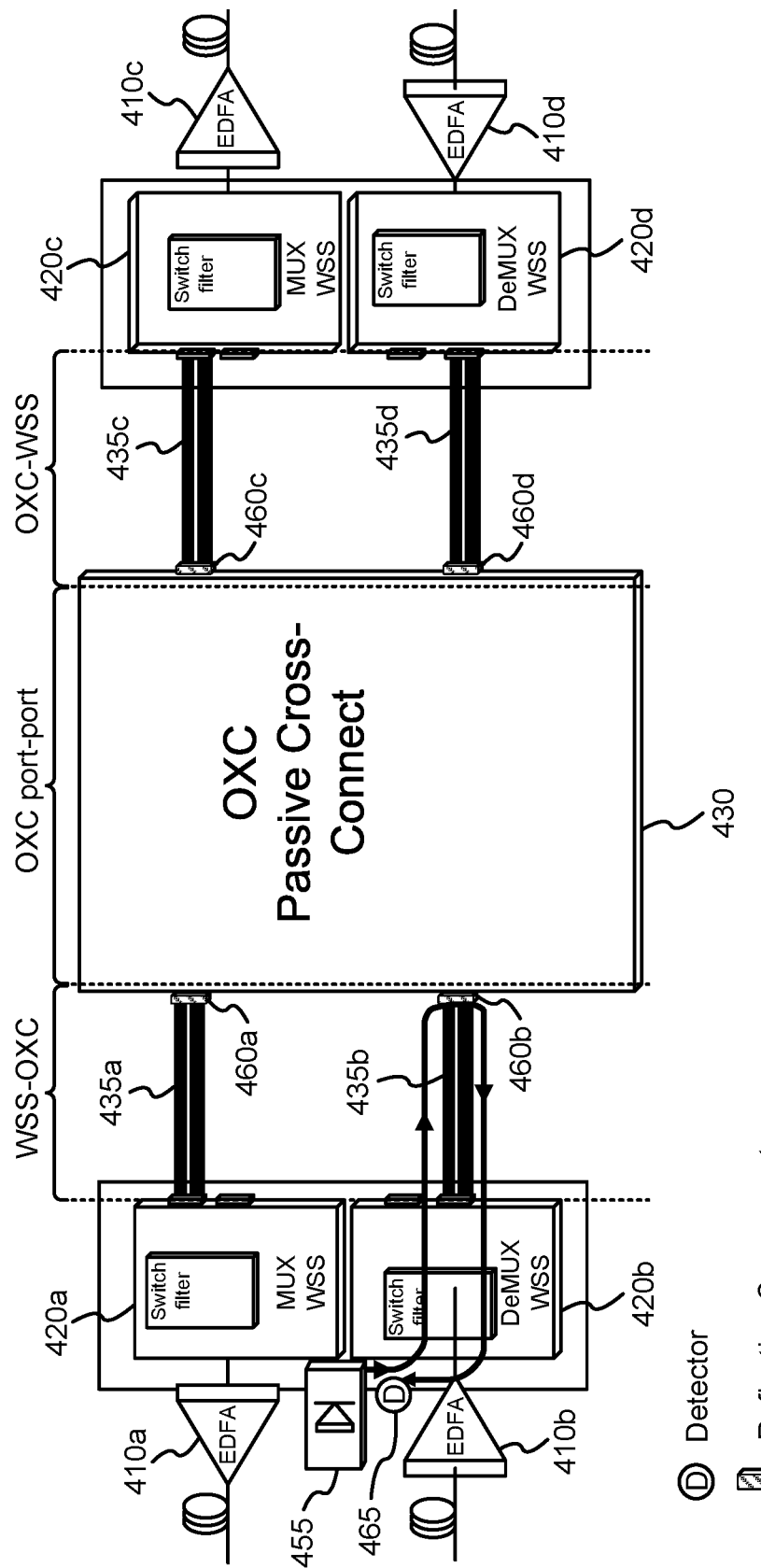
FIGS. 4A to 4C illustrate operation of an apparatus within a host ROADM, in accordance with an embodiment of the present invention.
Figure 4B:
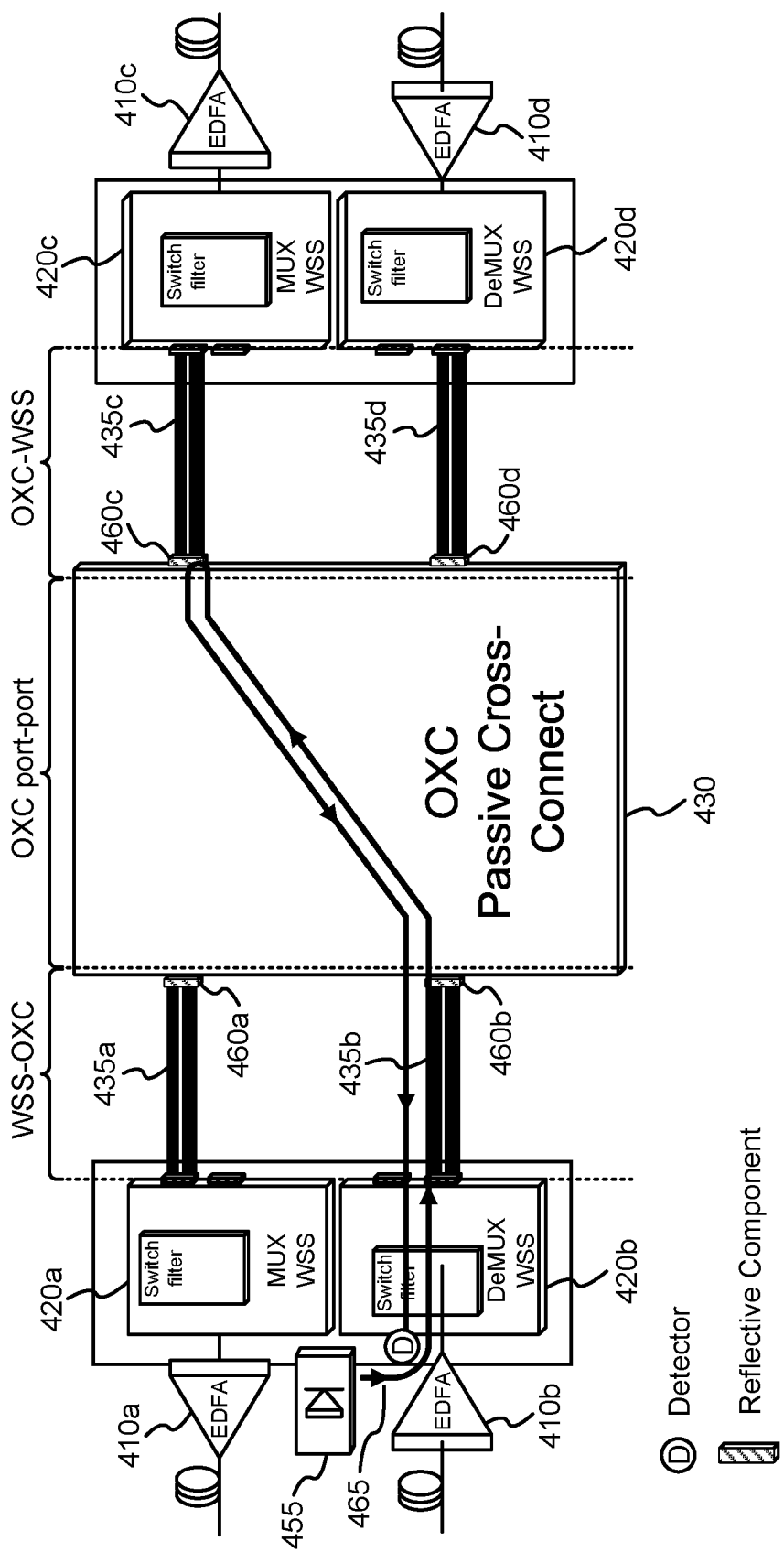
Figure 4C:
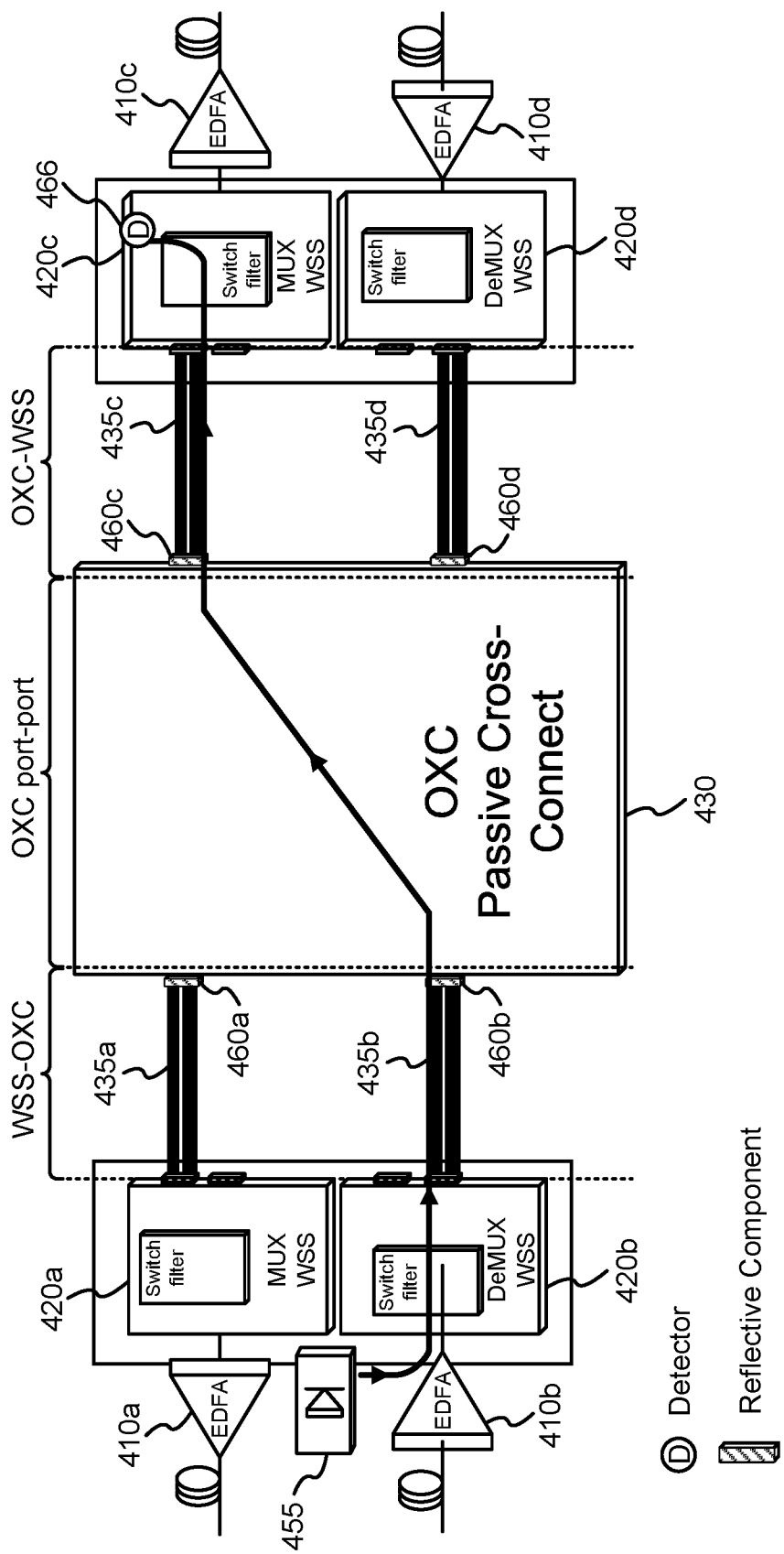

FIGS. 4A to 4C illustrate a monitoring apparatus integrated with a ROADM host device according to an embodiment of the present invention. The ROADM includes an OXC module 430, WSS-to-OXC and OXC-to-WSS optical interconnect cables 435a, 435b, 435c, 435d, WSS components 420a, 420b, 420c and 420d, and EDFAs 410a, 410b, 410c and 410d. A subset 435a, 435b, 435c, 435d of the total number of optical interconnect cables are shown. The add/drop module of the ROADM is not shown for clarity.

The monitoring apparatus includes a light source 455, a plurality of wavelength-selective reflectors 460a, 460b, 460c, 460d and a light detector 465, as well as a controller (not shown). The light source 455 and light detector 465 are illustrated as being integrated into the WSS component 420b. At least one other light source and light detector may similarly be integrated into the WSS component 420d. The WSS is operated to route light from the light source 455 onto a selected light path, corresponding to a selected optical fiber on a selected cable. Although only a single cable per WSS component is shown, the WSS can optically couple the same light source 455 to different optical fibers on the same cable, as well as to different optical fibers on different cables. The reflectors are provided at the various connector ports of the OXC module 430.

According to FIG. 4A, light from the light source 455 is coupled onto a light path supported by a particular fiber on a particular optical interconnect cable 435b. The light is reflected by a reflector 460b positioned across the fiber at the interface between the optical interconnect cable 435b and the OXC module 430. The same reflector component can include multiple reflectors (or a single wide reflector) positioned across multiple fibers of the same optical interconnect cable 435b. The reflected light travels back along the same particular fiber and through the WSS to the light detector 465.

According to FIG. 4B, light from the light source 455 is coupled onto the same light path as in FIG. 4A. However, in this case the light has a different wavelength than in FIG. 4A such that the light is passed through the reflector 460b and is coupled onto an internal optical waveguide, such as an optical fiber, which connects to another cable interface of the OXC module 430. The light is then reflected by a reflector 460c positioned at this other cable interface. The reflected light travels back along the same light path and through the WSS to the light detector 465.

According to FIG. 4C, light from the light source 455 is coupled onto the same light path as in FIGS. 4A and 4B. However, in this case the light has yet another different wavelength than in FIGS. 4A and 4B such that the light is passed through the reflectors 460b and 460c and is coupled onto another optical interconnect cable 435c. The light passes through the optical interconnect cable 435c and via a cable interface to the WSS component 420c. The light is routed to a second light detector 466 that is integrated into the WSS component 420c. Detection for this particular path therefore does not rely on reflection by a reflector. Alternatively, the light detector 466 can be replaced by a reflector which reflects the light back along the light path to the detector 465 for detection. As such, three light path segments can be monitored. Other light paths can be monitored similarly.

FIGS. 4A to 4C illustrate monitoring of optical connections between WSS modules and the OXC module, and between pairs of WSS modules separated by the OXC module. However, it is contemplated that optical connections between other components, such as between WSS modules and EDFAs, or between WSS modules or the OXC module and add/drop modules, can similarly be performed.

Figure 5:
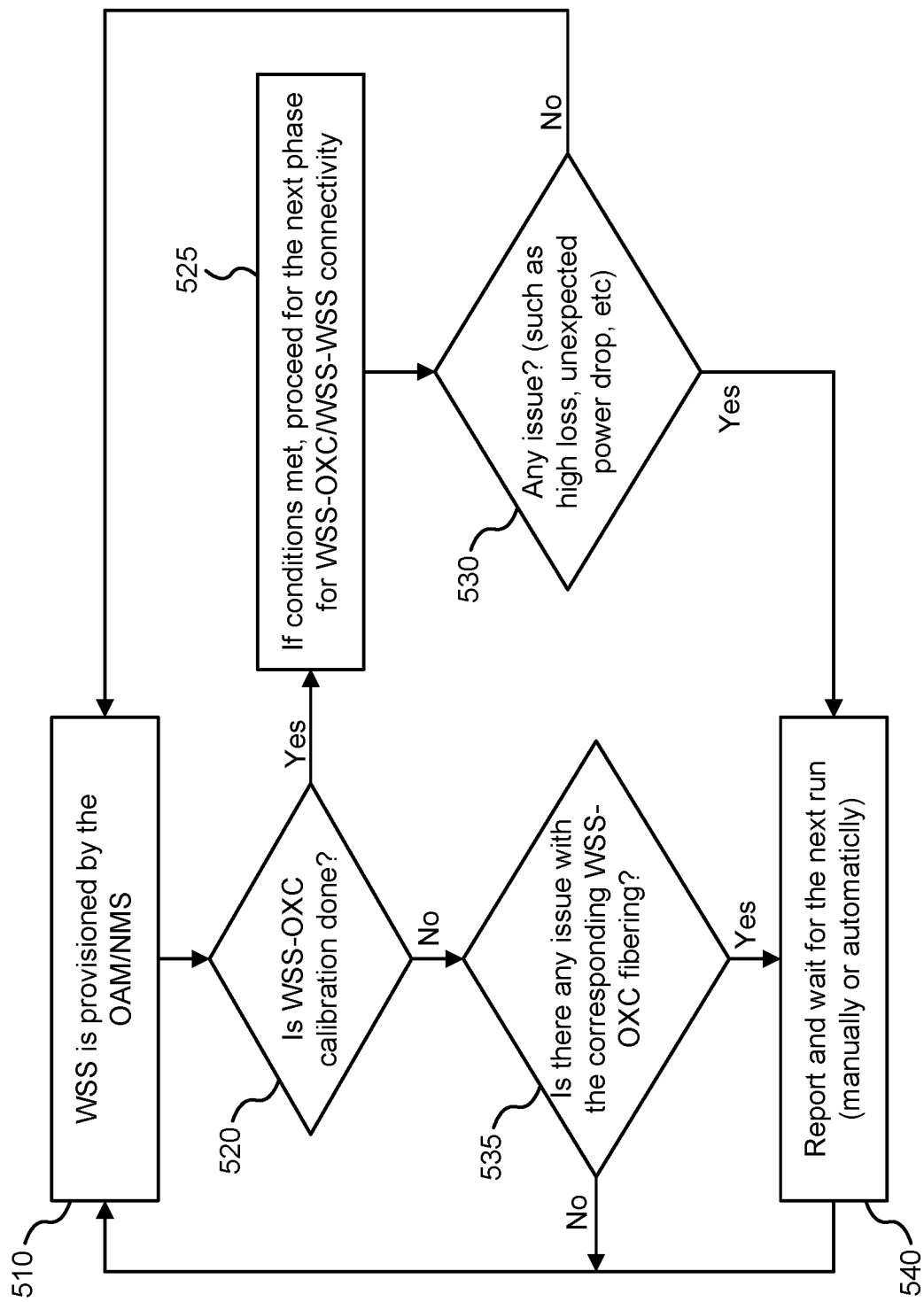
FIG. 5 illustrates a method for monitoring, calibrating, or monitoring and calibrating an optical networking device, according to an embodiment of the present invention.

FIG. 5 illustrates a method for monitoring, calibrating, or monitoring and calibrating an optical networking device, according to an embodiment of the present invention. The method can be performed repeatedly, for example continuously or according to a schedule. In operation 510, a WSS of a ROADM, or the ROADM itself, is considered provisioned by the Operations, Administration and Maintenance (OMS) part of a Network Management System (NMS). In operation 520, a determination is made as to whether calibration of the WSS-to-OXC interconnections of the ROADM is complete. If so, a next phase 525 for monitoring WSS-to-OXC connectivity, WSS-to-WSS connectivity, or both (within the ROADM), is initiated. During this next phase 525, if an issue is encountered 530, such as high path losses, or unexpected power drops, a report is generated 540 and a wait is entered for manual or automatic initiation of the next monitoring run. Otherwise, the method repeats without a report being generated. If calibration of the WSS-to-OXC interconnections of the ROADM is incomplete, a determination 535 is made as to whether there are any issues with the corresponding WSS-to-OXC interconnect fibers. If so, a report is again generated 540 and a wait is entered for manual or automatic initiation of the next monitoring run. In the above, an issue can be defined by comparison of measurements to a desired or expected loss measurement threshold. This threshold can be manually provisioned by an operator or provisioned by the NMS.

Figure 6:
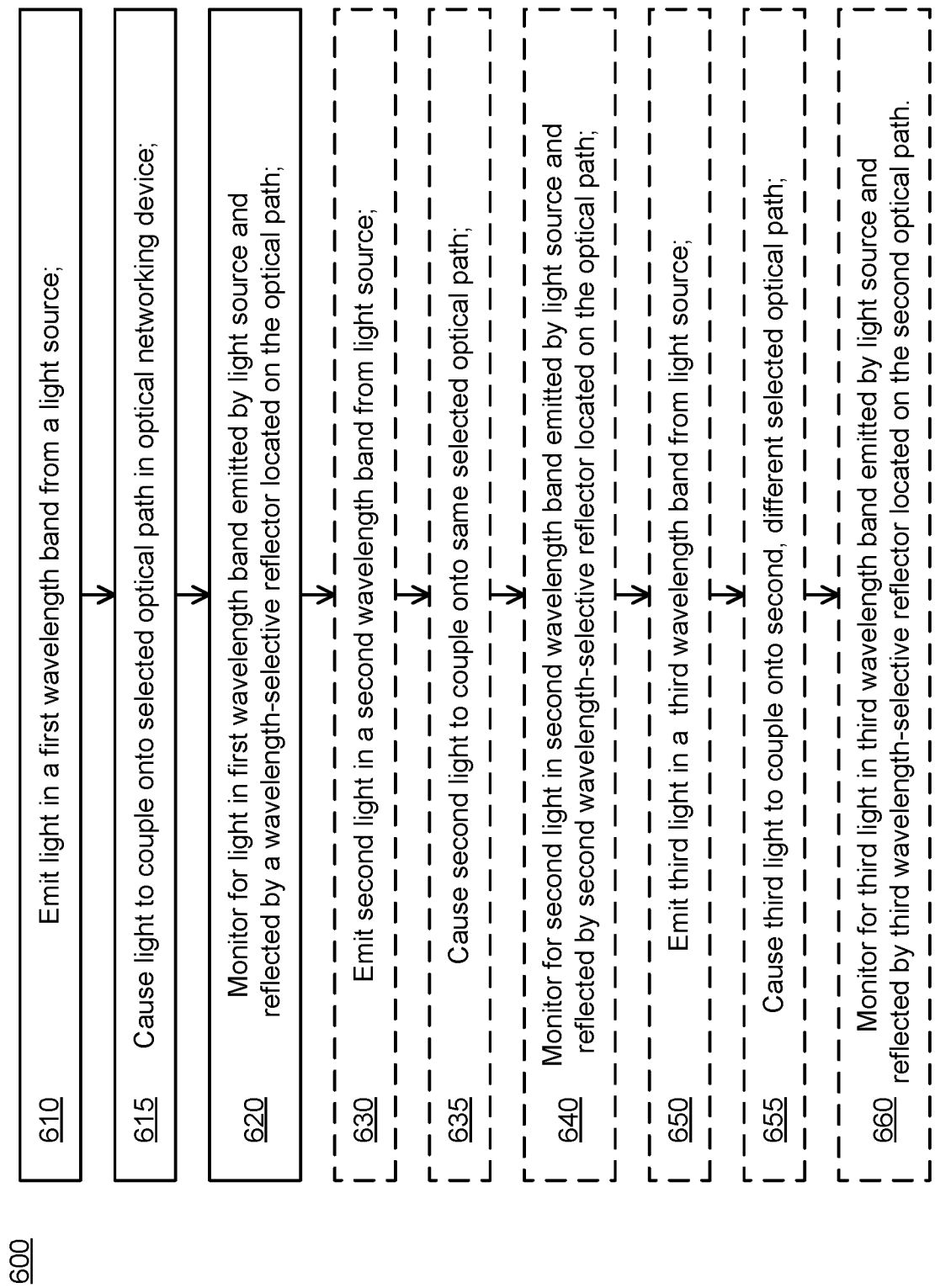
FIG. 6 illustrates a method for monitoring an optical networking device, according to an embodiment of the present invention.

FIG. 6 illustrates a method 600 for monitoring an optical networking device, according to an embodiment of the present invention. The method can be performed automatically by a controller and associated equipment such as a light source and light detector, for example. The method includes emitting 610 light in a first wavelength band from a light source, for example integrated into or otherwise coupled to the optical networking device. The method further includes causing 615 the light to couple onto a selected optical path in the optical networking device. Causing the light to couple onto the selected optical path may comprise operating a wavelength selective switch (WSS) of the optical networking device to route the light onto the selected optical path. The WSS is further operative to controllably route optical communication signals through the optical networking device according to a primary function of the optical networking device.

The method further includes monitoring 620, using a light detector, for light in the first wavelength band emitted by the light source and reflected along the optical path toward the light detector by a wavelength-selective reflector. The reflector is located at a predetermined location on the optical path and is configured to reflect light in the first wavelength band and pass light having wavelengths outside of the first wavelength band. The light detector may be integrated into or otherwise coupled to the optical networking device. The reflector is integrated into the optical path.

In some embodiments, a second reflector is located at a second predetermined location on the optical path and is configured to reflect light in a second wavelength band separate from the first wavelength band, and to pass light having wavelengths out of the second wavelength band. In this case, the method may further include emitting 630 second light in the second wavelength band from the light source, causing 635 the second light to couple onto the optical path, and monitoring 640, using the light detector, for light in the second wavelength band emitted by the light source and reflected along the optical path toward the light detector by the second reflector. The light detector is further placed and configured to receive and detect light from the optical path that is reflected by the second reflector.

In some embodiments, a third reflector is located at a predetermined location on a second optical path in the optical networking device. The third reflector is configured to reflect light in a third wavelength band equal to or different from the first wavelength band and the second wavelength band, and to pass light having wavelengths out of the third wavelength band. In this case, the method may further include emitting 650 third light in the third wavelength band from the light source, causing 655 the third light to couple onto the second optical path, and monitoring 660, using the light detector or another light detector, for third light in the third wavelength band emitted by the light source and reflected along the third optical path toward the light detector or the other light detector by the third reflector.

In various embodiments, causing 615, 635, 655 light to couple onto an optical path includes operating a wavelength selective switch (WSS) of the optical networking device to route the light onto the selected optical path. The WSS is further operative to controllably route optical communication signals through the optical networking device according to a primary function of the optical networking device.

The above method may be employed in particular when the optical networking device includes a first component, node or module and a second component, node or module connected by an optical interconnect, such as an optical fiber or multi-fiber cable. The optical interconnect includes a portion of the optical path, and the light source is co-located with the first component and the reflector is co-located with the second component.

Figure 7:
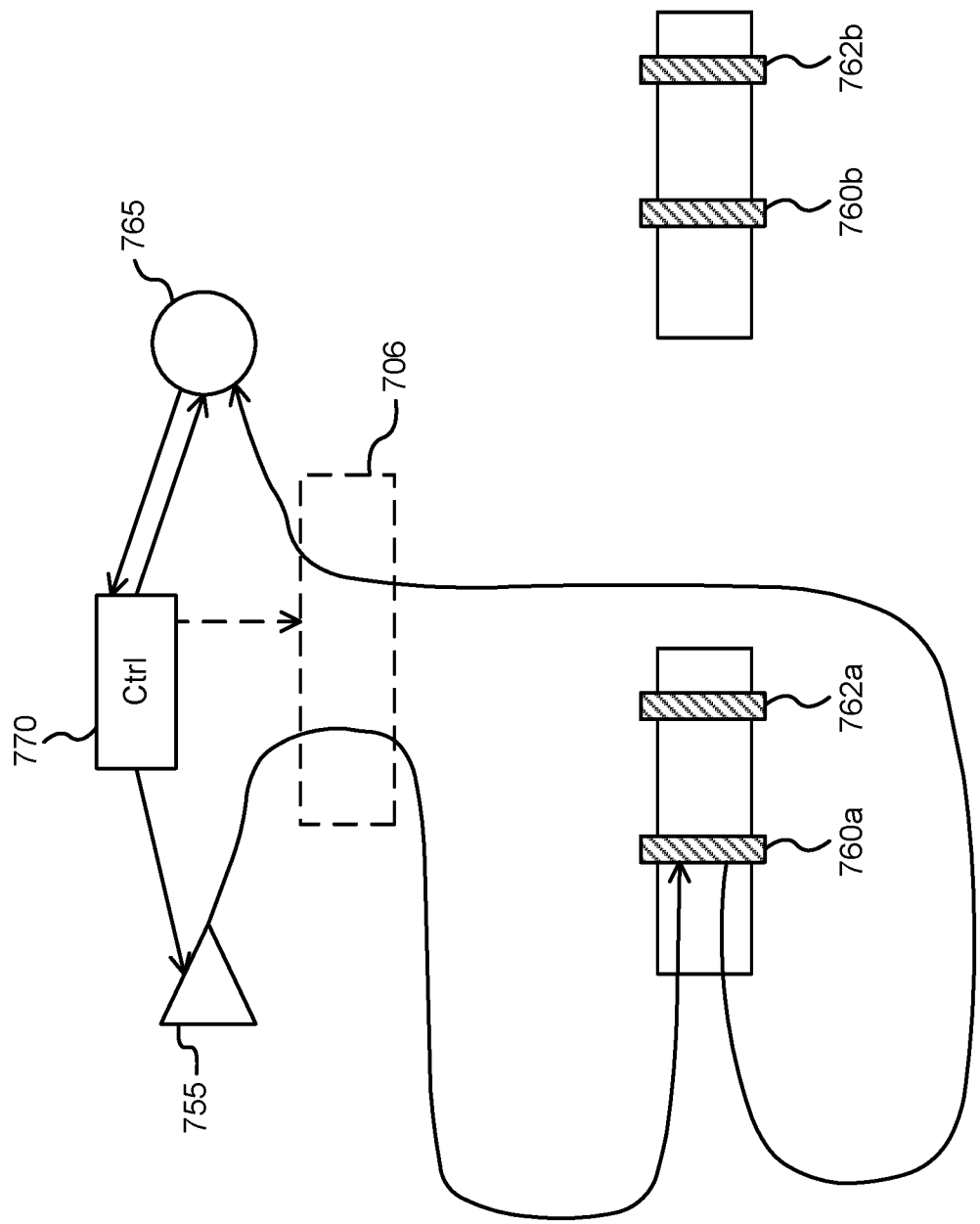
FIG. 7 illustrates a monitoring apparatus according to another embodiment of the present invention. Components of the monitoring apparatus are potentially separated from components of the optical device(s) being monitored.

FIG. 7 illustrates a monitoring apparatus according to another embodiment of the present invention. The monitoring apparatus includes a light source 755, a light detector 765, a controller 770, and one or more reflectors, such as reflectors 760a, 760b, 762a and 762b. The controller 770 is configured to operate the light source and receive signals from the light detector. The light source 755 is configured to emit light in a first wavelength band. The light is coupled onto an optical path associated with an optical device. The optical path can pass through one or multiple interconnected optical devices, and can be at least partially within the optical device or can connect to an input of the optical device. The optical device can be, for example, an optical cable, an optical switch, an OXC, or another optical element. A reflector 760a is located on the optical path, and the reflector is configured to reflect light in the first wavelength band and pass light having wavelengths outside of the first wavelength band. The reflector 760a can be located at an optical input or optical output of the optical device. The light detector 765 is placed and configured to receive and detect light from the optical path that is reflected by the reflector 760a. The light source 755, light detector 765 and controller 770 can be co-located with or separated from the optical device(s) being monitored. Although represented abstractly in FIG. 7, the path taken by light from the reflector 760a to the light detector 765 can follow the same physical path taken by light from the light source 755 to the reflector 760a, but in the reverse direction.

The monitoring apparatus can similarly operate with reflectors 760b, 762a, 762b of different optical paths or different portions of the same optical path. These reflectors may be integrated into the same optical device or different optical devices. The monitoring apparatus can therefore be configured to monitor a collection of optical devices, the optical interconnections there between, or both. In some embodiments, a switch 706, such as a WSS, can be operated, in response to signals emitted by the controller 770, in order to route light from the light source 755 to a desired reflector and to route reflected light from the reflector to the light detector 765.

In various embodiments, the wavelengths of light emitted by the light source and used for monitoring are selected such that they do not interfere, or interfere minimally, with optical communication signals being handled by the host device. In some embodiments, the wavelengths are selected so that they are in different wavelength bands than the optical communication signals. For example, the wavelengths of light emitted by the light source may be selected to be at the margins of the C-Band, when optical communication signals use this band. In some embodiments, the wavelengths are selected to be outside or at the margins of the band of wavelengths that are amplified by the optical amplifiers (e.g. EDFAs) of the host device. This causes the monitoring wavelengths to not be amplified, or to be amplified minimally, thereby mitigating leakage outside of the host device.

In other embodiments, the host device can be temporarily taken offline during monitoring operations (e.g. by briefly interrupting power to the EDFAs) or the light emitted by the light source can be of low power so that interference with optical communication signals is held to an acceptable low level. However, it may be preferable to perform monitoring without taking the host device offline in order to avoid service disruption.

Embodiments of the present invention can be used to support dynamic calibration and monitoring using real-time measurements. By measuring optical power along different host device optical paths and further along path portions, a map of path quality within a host device can be made. Monitoring and calibration may be performed at a relatively slow speed, for example on the order of seconds.

In some embodiments, the present invention can be implemented using a single light source, such as a multi-wavelength laser or LED, a single light detector, and a single circulator/directional coupler, along with a set of passive reflectors and either a separate controller or a modified controller of the host device. The single light source and light detector can be used for monitoring multiple light paths, such as sub-fibers. The circulator, or optical switches, can be used to retrieve reflected light from the reflector.

Because wavelength-selective (i.e. wavelength-specific) reflectors are integrated into the light paths, monitoring signals are much stronger than if alternative technologies such as optical time-domain reflectometry were being used. This allows for faster and less complex monitoring operations to be employed.

Embodiments of the present invention may be integrated into network equipment such as ROADMs and other equipment comprising one or more WSSs. The light source and light detector may be integrated with the WSS and the WSS may be operated to route light from the light source and to the light detector.

In various embodiments, one or more eDLs (enhanced dummy lights) present in a node can be used for the purpose of node monitoring and calibration. Such light sources need sufficient power that adequate amounts of reflected light can be registered by the corresponding light detectors. LEDs, lasers, or very low power amplifiers (e.g. Amplified Spontaneous Emission ASE) amplifiers) can be used for this purpose. The light source can be integrated into an appropriate module of the host device or the module can include a port for removable connection to the light source. A light source capable of controllably emitting light in selected wavelength bands and at selected times can be used.

In some embodiments, the light detector is located proximate to at least the input port of some or all MTP/MPO single fibers. In some embodiments, another light is located proximate to at least the output port of some or all MTP/MPO single fibers.

In some embodiments, measurements can be made that are indicative of path loss along light paths relying on one or a series of optical fibers or other optical waveguides. Path loss can be correlated with the amount of reflected light measured at a light detector. For a ROADM such as is illustrated in FIG. 3, this can include loss measurements from a first WSS to a second WSS, loss measurements from the first WSS to the OXC, loss measurements from the OXC to the second WSS, or a combination thereof. Other connectivities in the host device can similarly be measured.

It is noted that optical path loss can vary for example due to the port connections between optical interconnect fibre cables and modules such as WSS and OXC modules to which the cables are connected, for example via MTP/MPO connectors. Losses may vary between ports as well as being wavelength dependent. Embodiments of the present invention may track the evolution of optical path loss is over time, which may arise due to effects such as drifts an aging, which are not captured in initial calibration data.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A monitoring apparatus for an optical device, the monitoring apparatus comprising:
    a light source configured to emit light in a first wavelength band towards a reflector located a known distance from the light source, the light coupled onto a selected optical path associated with the optical device;
    a light detector placed and configured to receive and detect light from the optical path that is reflected by the reflector; and
    a controller configured to operate the light source and process received signals from the light detector to perform a measurement of the optical path, the controller further configured to cause the light to couple onto the selected optical path associated with the optical device;
wherein the monitoring apparatus is further configured to perform a calibration operation for the optical device based on the measurement.

2. The apparatus of claim 1, wherein the optical device comprises a first component and a second component connected by an optical interconnect, the optical interconnect comprising a portion of the optical path, and wherein the light source is co-located with the first component and the reflector is co-located with the second component.

3. The apparatus of claim 1, wherein one or more of the light source, the light detector and the controller are separate from the optical device.

4. The apparatus of claim 1, wherein the reflector is a first reflector, the known distance is a first known distance, and further comprising a second reflector located at a second known distance from the light source, the second reflector configured to reflect light in a second wavelength band separate from the first wavelength band, and to pass light having wavelengths out of the second wavelength band, and further wherein:

the light source is further configured to emit second light in the second wavelength band, the second light coupled onto the optical path;

the light detector is further placed and configured to receive and detect light from the optical path that is reflected by the second reflector.

5. The apparatus of claim 4, wherein the first known distance is at an ingress to the second reflector, and the second known distance is at an egress of the second reflector.

6. The apparatus of claim 5, wherein the optical device is a reconfigurable optical add-drop multiplexer (ROADM), the first component is a wavelength selective switch and the second component is an optical cross-connect.

7. The apparatus of claim 1, wherein the reflector is a first reflector, the known distance is a first known distance, the optical path is a first optical path, and further comprising a second reflector located at a known distance on the second optical path associated with the optical device, the second optical path having an endpoint separate from an endpoint of the optical path, the second reflector configured to reflect light in a second wavelength band equal to or different from the first wavelength band, and to pass light having wavelengths out of the second wavelength band and wherein:

the light source is coupled onto the first optical path via the endpoint of the first optical path and onto the second optical path via the endpoint of the second optical path concurrently or at a different time;

the light source is further configured to emit light in the second wavelength band, the light in the second wavelength band coupled onto the second optical path; and the light detector is further placed and configured to receive and detect light from the second optical path that is reflected by the second reflector.

8. The apparatus of claim 1, wherein the optical device comprises a wavelength selective switch, and wherein WSS is operated by the controller to selectably couple light from the light source onto the optical path.

9. The apparatus of claim 1, wherein the controller is configured to operate the light source and process the signals received from the light detector repeatedly to perform successive measurements of the optical path, and to provide an indication of quality of the optical path based on the successive measurements.

10. The apparatus of claim 1, wherein the optical device comprises a multi-fiber cable, and wherein the reflector is located at an end of the multi-fiber cable.

11. An optical networking device comprising the monitoring apparatus according to claim 1.

12. A method for monitoring an optical device, comprising:

emitting light in a first wavelength band from a light source;

causing the light to couple onto a selected optical path associated with the optical device;

monitoring, using a light detector, for light in the first wavelength band emitted by the light source and reflected along the optical path toward the light detector by a reflector, the reflector located at a predetermined location on the optical path and configured to reflect light in the first wavelength band and pass light having wavelengths outside of the first wavelength band;

operating the light source and processing signals received from the light detector to perform a measurement of the optical path; and performing a calibration operation for the optical device based on the measurement.

13. The method of claim 12, wherein the optical device comprises a first component and a second component connected by an optical interconnect, the optical interconnect comprising a portion of the optical path, and wherein the light source is co-located with the first component and the reflector is co-located with the second component.

14. The method of claim 12, wherein the reflector is a first reflector, the known distance is a first known distance, and further comprising a second reflector located at a second known distance on the optical path and is configured to reflect light in a second wavelength band separate from the first wavelength band, and to pass light having wavelengths out of the second wavelength band, and wherein the light detector is further placed and configured to receive and detect light from the optical path that is reflected by the second reflector, the method further comprising:

emitting second light in the second wavelength band from the light source;

coupling the second light onto the optical path; and monitoring, using the light detector, for light in the second wavelength band emitted by the light source and reflected along the optical path toward the light detector by the second reflector.

15. The method of claim 12, wherein the reflector is a first reflector, the known distance is a first known distance, and further comprising a second reflector located at a second known distance on a second optical path associated with the optical device, the second reflector configured to reflect light in a second wavelength band equal to or different from the first wavelength band, and to pass light having wavelengths out of the second wavelength band, the method further comprising:

emitting second light in the second wavelength band from the light source;

coupling the second light onto the second optical path; and monitoring, using the light detector or a second light detector, for light in the second wavelength band emitted by the light source and reflected along the second optical path toward the light detector or the second light detector by the second reflector.

16. The method of claim 12, wherein causing the light to couple onto the selected optical path associated with the optical device comprises operating a wavelength selective switch (WSS) of the optical device to route the light onto the selected optical path, the WSS further operative to controllably route optical communication signals through the optical device according to a primary function of the optical device.

17. The method of claim 12, further comprising: operating the light source and processing signals received from the light detector repeatedly to perform successive measurements of the optical path; and generating an indication of quality of the optical path based on the successive measurements.

18. The method of claim 12 wherein the predetermined location comprises a known distance from the light source.

* * * * *